United States Patent Office 3,004,955
Patented Oct. 17, 1961

3,004,955
SULFONE POLYESTERS
Christian F. Horn, New York, N.Y., assignor to Union Carbide Corporation, a corporation of New York
No Drawing. Filed Oct. 7, 1957, Ser. No. 688,432
14 Claims. (Cl. 260—75)

This invention relates to novel polyesters and shaped articles such as filaments, films, coatings and molded products thereof, as well as to a method for their preparation.

In accordance with the invention, it has been found that polyesters having recurring structural units of the general formula (I)
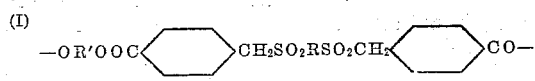

wherein R is a divalent saturated alkylene radical and R' is a divalent saturated alkylene, alkylene ether or aralkylene radical, can be prepared by reaction of alpha, omega diols containing from two to ten carbon atoms with disulfones of the general formula (II)
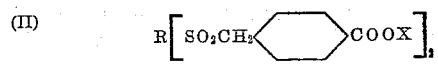

in which R is as defined in Formula I and the X's are H or lower alkyl radicals capable of forming an alcohol that has a boiling point below about 200° C.

The polyesters of the invention, and shaped articles thereof, have a considerable number of important advantages. They are crystalline, fiber-forming linear polymers having melting points predominantly within the range of about 190 to 250° C., a high degree of chemical stability, insolubility in water, dilute inorganic and organic acids, alkalies, and most organic solvents. They are capable of absorbing coloring materials and are therefore readily dyed. They possess good dielectric properties and moisture regain and are bright, tough resins that can readily be formed into fibers and films which, upon being cold-stretched, have excellent strength, resiliency and pliability.

The disulfones that are preferred as starting materials in accordance with the method of the invention are those identified in Formula II in which R is a straight or branched chain containing up to ten carbon atoms and the X's are methyl groups. Dimethyl 4,4'-(ethylenedisulfonyl)ditoluate, dimethyl 4,4'-(trimethylenedisulfonyl)ditoluate, dimethyl 4,4'-(2,2-dimethyltrimethylenedisulfonyl)ditoluate, dimethyl 4,4'-(tetramethylenedisulfonyl)ditoluate, dimethyl 4,4'-(pentamethylenedisulfonyl)ditoluate, dimethyl 4,4'-(3-methylpentamethylenedisulfonyl)ditoluate, dimethyl 4,4'-(hexamethylenedisulfonyl)ditoluate, dimethyl 4,4'-(decamethylenedisulfonyl)ditoluate, and dimethyl 4,4'-(3-ethylpentamethylenedisulfonyl)ditoluate are typical of the preferred disulfones. Higher alkyl diesters, i.e., in which the X's are ethyl, propyl, etc., are operable so long as the terminal alkyl radicals (V)

are capable of forming alcohols boiling below about 200° C. The corresponding acids, acid chlorides, diamides and other polymerizable derivatives are likewise operable.

The disulfones can be prepared in several ways. One method of preparation that has been found suitable involves reacting an alkylene dithiol, R(SH)$_2$, in which the R is as defined with reference to Formula I, with chlorotoluic acid,

in the presence of sodium hydroxide to form the corresponding dithio dicarboxylic acid, oxidizing the acid thus formed with peracetic acid or other suitable oxidizing agent to convert it into the corresponding disulfonyl dicarboxylic acid and esterifying it with the appropriate alcohol. An entire sequence of reaction for forming a disulfonyl dicarboxylic acid and then esterifying it to the corresponding dimethyl ester is illustrated as follows:

(III)(A)

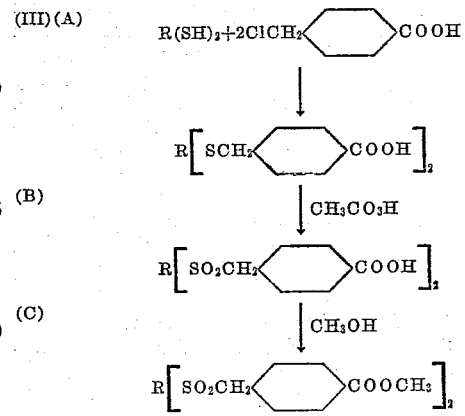

The alpha, omega diols that are suitable as starting materials in accordance with the invention include, as indicated in the definition of R' in Formula I, dihydroxy compounds of the general formula (IV)        R'(OH)$_2$ in which R' is a divalent saturated alkylene, alkylene ether or aralkylene radical containing from two to ten carbon atoms. These include particularly alpha, omega polymethylene glycols of the formula HO(CH$_2$)$_n$OH in which $n$ is an integer from 2 to 10, branched chain and alkylene ether alpha, omega glycols such as 3-methyl-1,5-pentanediol and triethylene glycol, and paradialkylene phenylene glycols such as para-xylylene glycol and the like.

The reaction of the primary starting materials in forming substantially linear polyesters is believed to take place in essentially two stages, an ester exchange reaction and a polycondensation. While there is reason to believe that these stages are not necessarily separate and distinct and that they may at least in part take place simultaneously, the mechanism of the reactions is set forth to facilitate ready comprehension of the method involved:

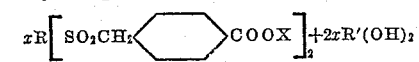

| ester exchange

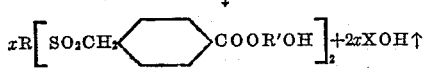

| polycondensation

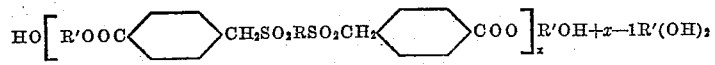

It will be evident that the ester exchange reaction involves substantially complete elimination of the X alkyl radicals in the form of the corresponding alcohol and that the polycondensation involves the elimination of excess glycol. It follows that for most effective preparation of the linear polymers, the alkyl radicals X should be lower alkyl, preferably methyl, radicals so that the resulting alcohol will have a relatively low boiling point, or at least a lower boiling point than the excess glycol eliminated in the second stage. It is also apparent that the boiling point of the glycol used as initial reactant is at least partially determinative of the conditions for polycondensation and removal of excess glycol. If a relatively low boiling glycol, e.g., ethylene glycol, is used, it can be used in considerable excess because a substantial amount can be distilled without in the least degrading the polymer through thermal decomposition. If, however, a higher boiling glycol such as 1,10-decanediol is used, it is desirable to use a smaller excess.

The initial reactants are admixed, preferably with a catalyst, and subjected to conditions producing ester interchange until the ester interchange is substantially complete. These conditions involve heating the reactants to a temperature sufficiently high to bring about the reaction and to eliminate the alcohol formed thereby. Temperatures of the order of about 150 to 250° C. are ordinarily sufficient to initiate and complete the ester interchange. For polycondensation and elimination of the glycol, the temperature employed is above the melting point of the polymer, below the temperature at which the polymer becomes thermally unstable and above the boiling point of the glycol under the pressure conditions of operation. As a rule, this temperature of polycondensation is advantageously about 8 to 30° C. above the melting point of the polymer. If the boiling point of the glycol to be eliminated is substantially higher than this temperature, the polycondensation can be carried out under reduced pressure so as to assure complete removal of excess glycol from the melt. Polycondensation temperatures within the range of 180 to 285° C. and preferably between about 210 and 280° C. lead to uniformly good results although departures from these temperatures, i.e., as high as 300° C., may be permissible if some discoloration and degradation is not considered unduly detrimental.

The reactions should be carried out under an inert atmosphere such as nitrogen and may proceed at atmospheric, reduced, or superatmospheric pressure. In the preferred embodiment of the method of the invention a stream of nitrogen is passed through the melt so as to provide an inert atmosphere and at the same time agitate the reactants to assist in removing the alcohol or glycol distilled from the reaction mixture. When glycols are used that boil at temperatures too high for easy elimination at atmospheric pressure and at temperatures unduly close to or above the temperature of thermal degradation of the monomers or polymers, it is desirable to sweep excess glycols out of the melt with an inert gas such as nitrogen, or to operate under reduced pressure as indicated earlier, or to use a combination of these measures.

The reaction may also be carried out by means of the solution polymerization technique that involves dissolving the starting materials in an inert solvent such as a paraffin oil or other high boiling aliphatic or aromatic hydrocarbon containing no reactive groups, followed by heating at elevated temperatures under a nitrogen atmosphere until the desired degree of polymerization has been reached or the molecular weight of the product is high enough to precipitate from the hot solution.

In starting with a glycol and a disulfone diester, ester interchange catalysts are preferably used. These include such well known catalysts as metallic lithium, sodium, potassium, calcium, beryllium, magnesium, zinc, cadmium, aluminum, chromium, manganese, iron, cobalt, nickel, silver, mercury, tin, lead, bismuth, antimony, platinum and rhodium. The alcoholates, oxides and salts of many of these metals with weak inorganic and organic acids are also useful as catalysts in the ester interchange and polymerization reaction. In addition, titanium alkoxides, organo-tin compounds, alkali hydrides, and the like, are suitable as catalysts for the polymerization. If the disulfone diacids, i.e., where X=H, are used, it is preferable to employ either no catalyst or small amounts of catalysts such as para-toluenesulfonic acid, zinc chloride, boron trioxide, camphor-sulfonic acid, or the like.

The amount of catalyst used is preferably within the range of about 0.005 to about 0.5% and preferably between about 0.05 and 0.25% based on the total amount of disulfone that is used. Departures from these ranges are permissible. However, the use of more than about 0.5% may result in discoloration of the ultimate polymer and amounts less than about 0.005% will reduce the rate of reaction to an extent that would not be practicable for commercial operation.

The molar proportion of glycol used in the reaction should, as indicated in Equation V, at least equal and preferably be at least twice the molar amount of disulfone. When a readily removable glycol such as ethylene glycol is used, there is some advantage in using a higher proportion of glycol, e.g., up to about ten mols per mol of disulfone, inasmuch as the glycol will tend to act as a solvent for the catalyst and to assure complete ester exchange. With higher boiling alcohols, however, it is advantageous to use less excess.

It is to be understood, of course, that mixtures of disulfones and mixtures of diols may be employed in order to form copolymers in which the different disulfone and glycol residues are present in ordered or random distribution. The polymers so produced are generally somewhat less crystalline, lower melting and softer than those obtained by using a specific disulfone and a specific glycol.

The method, products and the utility and advantages thereof will become further apparent from the following detailed examples included to illustrate the best modes now contemplated of practicing the invention. In these examples the parts are by weight and the reduced viscosity, used as a measure of the degree of polymerization, is defined by Equation VI:

$$(\text{VI}) \qquad I_R = \frac{\left(\frac{\Delta N}{N_0}\right)}{C}$$

in which $\Delta N$ is the difference between flow time of solution and flow time of solvent, $N_0$ stands for flow time of solvent and C is the concentration of the polymer in grams per 100 cc. of solution. Reduced viscosity values were obtained at 30° C., the solvent was a 3:2 mixture of phenol and tetrachloroethane and the concentration of the polymer in the solution was 0.2 gram/100 cc.

*Example 1*

Dimethyl 4,4'-(hexamethylenedisulfonyl)ditoluate (10 grams), 1,4-butanediol (10 grams), magnesium acetate (0.012 gram) and tetraisopropyl titanate (0.005 gram) were charged to a glass condensation vessel equipped at the bottom with a sintered glass gas diffusion plate. The mixture was heated for thirty minutes at 210° C. while passing a gentle stream of nitrogen through the melt which facilitate the removal of methanol formed during the ester exchange reaction. After the theoretical amount of methanol was distilled out, the temperature was slowly raised to 230° C. to distill out the glycol excess. The polycondensation reaction was conducted over a period of seven hours at 255° C. while forcing a stream of 1–1.2 liter per minute nitrogen through the melt.

The polymer obtained was very tough and could be formed into filaments. The reduced viscosity of the polyester was 0.46; its melting point 244 to 246° C. The resin was crystalline.

*Example 2*

The general procedure of Example 1 was repeated except that dimethyl 4,4'-(trimethylenedisulfonyl)ditoluate (10 grams), 1,10-decanediol (10 grams), magnesium acetate (0.012 gram) and tetraisopropyl titanate (0.005 gram) were employed in the polycondensation. After twenty-five minutes ester exchange at 240° C., the glycol excess was removed by passing a rather vigorous stream of nitrogen (1.6 liters per minute) for forty minutes through the melt. The polycondensation reaction was finally carried out at 240 to 250° C. for five hours while passing 1.9 liters per minute nitrogen through the melt at atmospheric pressure.

After this time the polycondensation cycle was finished, and a light polymer having the reduced viscosity of 0.95 and melting at 212 to 214° C. was obtained. The resin could be melt-extruded into filaments which were stretchable up to 300%.

*Example 3*

The general procedure of Example 1 was repeated except that dimethyl 4,4'-(tetramethylenedisulfonyl)ditoluate (10 grams), 1,6-hexanediol (10 grams), magnesium acetate (0.012 gram) and tetraisopropyl titanate (0.005 gram) were used in the polycondensation. When the initial ester exchange was completed (ten minutes at 235° C.), excess glycol was removed by passing a fast stream of nitrogen through the melt (thirty-five minutes at 235° C.). The temperature was then raised to 250° C. and the polymerization was conducted for about three hours.

The resulting polymer was fiber-forming and melted at 243 to 245° C.; its reduced viscosity was 0.84.

*Example 4*

The general procedure of Example 1 was repeated except that dimethyl 4,4'-(tetramethylenedisulfonyl)ditoluate (10 grams), 1,10-decanediol (10 grams), magnesium acetate (0.012 gram) and tetraisopropyl titanate (0.005 gram) were employed in the polycondensation. The ester exchange was brought about at 240° C. (twenty minutes) and excess glycol was removed at the same temperature over a period of thirty minutes. Polymerization was performed at 230° C. for four hours while passing a 2.3 liters per minute stream of nitrogen through the melt.

A white polymer, having the reduced viscosity of 0.88 and a melting point of 218 to 220° C. was obtained. The polyester could readily be extruded into filaments which could be cold-drawn to an extent of 500%. The resin showed properties suggesting application as molding material.

*Example 5*

The general procedure of Example 1 was repeated except that dimethyl 4,4'-(pentamethylenedisulfonyl)ditoluate (10 grams), 1,5-pentanediol (10 grams), magnesium acetate (0.012 gram) and tetraisopropyl titanate (0.005 gram) were used in the polymerization reaction. When the initial ester exchange was completed (one hour at 220° C.), the temperature was raised to 230° C. to remove excess glycol (thirty-five minutes).

Polymerization was conducted at 230 to 240° C. over a period of 4.3 hours while passing a two liter per minute stream of nitrogen through the melt.

The resulting polyester had a reduced viscosity of 0.9 and melted at 220° C. The resin showed excellent fiber-forming and cold-drawing properties. It could also be valuable material for injection molding and in coating applications.

*Example 6*

The general procedure of Example 1 was repeated except that dimethyl 4,4'-(pentamethylenedisulfonyl)ditoluate (10 grams), triethylene glycol (10 grams), magnesium acetate (0.012 gram) and tetraisopropyl titanate (0.005 gram) were employed in the polycondensation reaction. The initial ester exchange was brought about at 210° C. over a period of forty-five minutes. The temperature was then raised to 230° C. and a stream of nitrogen (1.9–2.4 liters per minute) was passed through the melt to facilitate the removal of excess glycol. Polycondensation was conducted at 230° C. for 2.5 hours while forcing 3.2 liters per minute nitrogen through the melt.

The resulting polymer was tough and showed excellent fiber-forming and cold-drawing properties. Its reduced viscosity was 0.57, its melting point 195° C.

*Example 7*

The general procedure of Example 1 was repeated except that dimethyl 4,4'-(pentamethylenedisulfonyl)ditoluate (83 grams), 1,10-decanediol (83 grams), magnesium acetate (0.10 gram) and tetraisopropyl titanate (0.0415 gram) were charged to the polycondensation vessel. After one hour ester exchange at 210° C. in nitrogen atmosphere, excess ethylene glycol was removed by passing 3–4 liters per minute nitrogen through the melt for 1.2 hours. The polycondensation was performed at the same temperature over a period of 9.2 hours while using as vigorous a nitrogen stream as was employed during the removal of excess glycol.

A very tough, white polyester with excellent film- and fiber-forming and cold-drawing properties was obtained which had a reduced viscosity of 0.87 and melted at 191° C. The polymer was melt-spun in a plunger-type spinning machine at 215° C. using a 30-hole 0.015" die. The filaments were taken up at 50:1 draw ratio into 121 denier filaments. The following physical data were obtained on these filaments:

Tenacity, g.p.d. --- 2.5
Elongation, percent --- 12
Dye affinity $E_{AB}$[1] --- 81.3
Young's modulus, g.p.d. --- 29

[1] $E_{AB}$ = percentage of dye in a dyebath of dispersed acetate dye, "Eastone Fast Red GLF" that is absorbed by the fiber in two hours at 100° C. in the absence of any carrier or dyeing assistant.

Besides being superior to other polyester fibers in dyeability, the filaments of this resin are also characterized by resilience which is better than that of polyethylene terephthalate. The immediate recovery of this material from 5 and 7% stretching is considerably better than that of polyethylene terephthalate. The ultimate recovery of the sulfone polyester was particularly striking. Complete recovery from stretches as high as 10% took place within five minutes, and indications were that most of the recovery took place within the first minute. In contrast, polyethylene terephthalate shows about 20% set (i.e., 2% residual deformation) five minutes after being stretched to 10% elongation.

*Example 8*

The general procedure of Example 1 was repeated except that dimethyl 4,4'-(hexamethylenedisulfonyl)ditoluate (10 grams), 1,5-pentanediol (10 grams), magnesium acetate (0.012 gram) and tetraisopropyl titanate (0.005 gram) were used in the polymerization reaction. After twenty-five minutes ester exchange at 210° C. in nitrogen atmosphere the temperature was raised to 230° C. and excess glycol was removed over a period of fifty minutes while passing a stream of one liter per minute nitrogen through the melt.

Polycondensation was performed at the same temperature for eight hours using 1.4–1.6 liters per minute nitrogen to sweep out the glycol formed in the melt.

A light resin, having a reduced viscosity of 0.98 and a melting temperature of 225 to 227° C., was obtained. The polymer could readily be extruded into filaments which exhibited cold-drawing properties. The polymer was also film- and foil-forming and can also be used in injection molding.

*Example 9*

The general procedure of Example 1 was repeated except that dimethyl 4,4'-(3-methylpentamethylenedisulfonyl)ditoluate (10 grams), 1,4-butanediol (10 grams), magnesium acetate (0.012 gram) and tetraisopropyl titanate (0.005 gram) were employed in the polymerization reaction. The initial ester exchange was brought about at 210° C. in nitrogen atmosphere. Thereafter, the temperature was raised to 235° C. and excess glycol was removed over a period of 1.5 hours while passing 1.4–1.6 liters per minute nitrogen through the melt. The polymerization was performed at the same temperature for 3.5 hours and a stream of 2–3 liters per minute nitrogen was led through the polymerization mass.

The polymer obtained was translucent and fiber-forming. The resin is suitable as film-former and in molding applications where transparency is required. The melting point of the resin is 213 to 215° C., its reduced viscosity is 0.55.

*Example 10*

The general procedure of Example 1 was repeated except that dimethyl 4,4'-(decamethylenedisulfonyl)ditoluate (10 grams), ethylene glycol (10 grams), magnesium acetate (0.012 gram) and tetraisopropyl titanate (0.005 gram) were used in the polymerization. The ester exchange was carried out for 1.5 hours at 190° C. in nitrogen atmosphere. Excess glycol was distilled out at 200° C. over a period of 0.7 hour while passing 1.2–1.4 liters per minute nitrogen through the mixture. Polycondensation was performed at 210° C. for 1.5 hours and at 230° C. for 2.5 hours using 1.9–2.4 liters per minute nitrogen to sweep out glycol formed in the melt.

A tough polymer, having excellent fiber-forming and cold-drawing properties was obtained which melted at 214° C. and had a reduced viscosity of 0.43. The resin properties suggest also applicability in the molding and coating fields.

It is to be expected that numerous modifications will readily become apparent to those skilled in the art upon reading this description. All such modifications are intended to be included within the scope of the invention as defined in the appended claims.

I claim:

1. A fiber-forming linear polymer consisting essentially of repeating structural units of the general formula

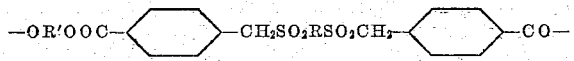

wherein R is a divalent saturated alkylene radical containing up to ten carbon atoms and R' is a divalent radical selected from the group consisting of saturated alkylene, alkylene ether and aralkylene radicals containing from two to ten carbon atoms.

2. Method which comprises heating a mixture consisting essentially of a disulfone of the general formula

wherein R is a divalent saturated alkylene radical containing up to ten carbon atoms and the X's stand for members selected from the group consisting of hydrogen and lower alkyl radicals of alcohols having boiling points below about 200° C. with an alpha, omega diol having the general formula $$R'(OH)_2$$

wherein R' is a divalent radical selected from the group consisting of saturated alkylene, alkylene ether and aralkylene radicals containing from two to ten carbon atoms to a temperature up to about 300° C. to obtain a fiber-forming melt.

3. Method which comprises heating a mixture consisting essentially of a disulfone of the general formula

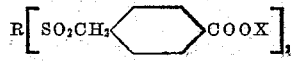

wherein R is a divalent saturated alkylene radical containing up to ten carbon atoms and the X's stand for members selected from the group consisting of hydrogen and lower alkyl radicals of alcohols having boiling points below about 200° C. with an alpha, omega diol having the general formula $$R'(OH)_2$$

wherein R' is a divalent radical selected from the group consisting of saturated alkylene, alkylene ether and aralkylene radicals containing from two to ten carbon atoms to a temperature of the order of about 150 to 250° C. to effect ester interchange and heating the reaction mixture to a temperature within the range of about 180 to 285° C. to obtain a fiber-forming melt.

4. Method which comprises heating a mixture consisting essentially of a disulfone of the general formula

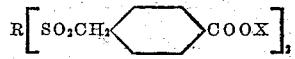

wherein R is a divalent saturated alkylene radical containing up to ten carbon atoms and the X's stand for members selected from the group consisting of hydrogen and lower alkyl radicals of alcohols having boiling points below about 200° C. with an alpha, omega diol having the general formula $$R'(OH)_2$$

wherein R' is a divalent radical selected from the group consisting of saturated alkylene, alkylene ether and aralkylene radicals containing from two to ten carbon atoms to a temperature of the order of about 150 to 250° C. to effect ester interchange, heating the reaction mixture to a temperature within the range of about 180 to 285° C. to obtain a fiber-forming melt and melt-spinning the resulting resin into filament form.

5. A fiber-forming linear polymer consisting essentially of repeating structural units of the formula

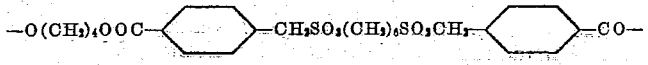

6. A fiber-forming linear polymer consisting essentially of repeating structural units of the formula

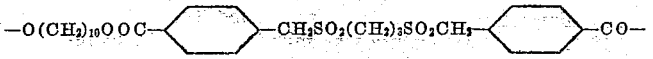

7. A fiber-forming linear polymer consisting essentially of repeating structural units of the formula

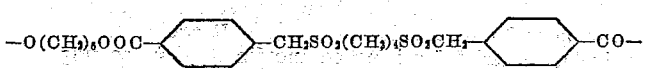

8. A fiber-forming linear polymer consisting essentially of repeating structural units of the formula

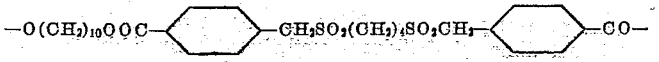

9. A fiber-forming linear polymer consisting essentially of repeating structural units of the formula

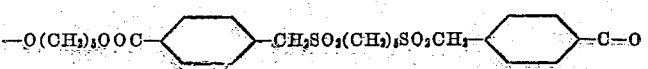

10. A fiber-forming linear polymer consisting essentially of repeating structural units of the formula

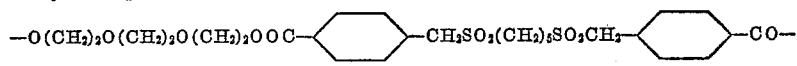

11. A fiber-forming linear polymer consisting essentially of repeating structural units of the formula

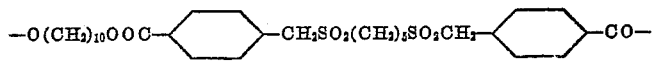

12. A fiber-forming linear polymer consisting essentially of repeating structural units of the formula

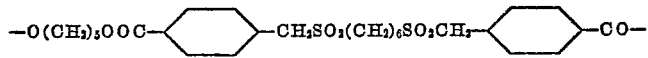

13. A fiber-forming linear polymer consisting essentially of repeating structural units of the formula

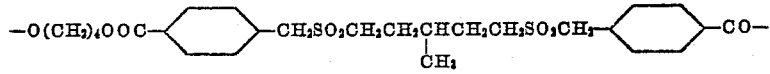

14. A fiber-forming linear polymer consisting essentially of repeating structural units of the formula

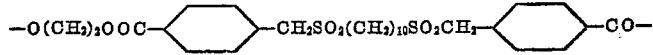

References Cited in the file of this patent
UNITED STATES PATENTS

| | | |
|---|---|---|
| 2,427,640 | Whitehill et al. | Sept. 16, 1947 |
| 2,614,120 | Caldwell | Oct. 14, 1952 |
| 2,720,502 | Caldwell | Oct. 11, 1955 |